Jan. 21, 1969  J. D. FLETCHER  3,423,003
METHOD AND MEANS FOR THE MANUFACTURE OF SPIRAL PIPING
Filed Sept. 23, 1966

INVENTOR
JOSEPH DUNSTAN FLETCHER
By Shoemaker and Mattare
ATTYS.

INVENTOR
Joseph Dunstan Fletcher
By Shoemaker and Mattare
Attys.

United States Patent Office 3,423,003
Patented Jan. 21, 1969

3,423,003
METHOD AND MEANS FOR THE MANUFACTURE OF SPIRAL PIPING
Joseph D. Fletcher, Sydenham, Johannesburg, Transvaal, Republic of South Africa, assignor to Tube and Pipe Industries (Proprietary) Limited, Elandsfontein, Transvaal, Republic of South Africa
Filed Sept. 23, 1966, Ser. No. 581,523
Claims priority, application Republic of South Africa, Sept. 28, 1965, 65/5,236; Apr. 26, 1966, 66/2,402, 66/2,403
U.S. Cl. 228—15        8 Claims
Int. Cl. B23k 29/00

ABSTRACT OF THE DISCLOSURE

The device forms a spiral pipe by welding together the abutting edges of a spirally wound strip and includes a material feed track having a bed of straightening rolls, an inverted pyramid assembly of freely rotatable forming rolls and a welding station both inside and outside the formed pipe. The bed of straightening rolls are upwardly and forwardly inclined and twisted to feed the strip over the central hollow roll of the forming assembly at a sharp angle to the axes of the forming rolls and with the edges of the strip abutting which edges that are welded together at the welding stations.

---

This invention relates to metal piping referred to as spiral piping by which is meant piping made from strips of metal wound into a spiral form with abutting edges of the strip welded together.

This type of piping has been made previously and in general the method of manufacture has consisted essentially of forcing the strip metal, usually mild steel, through a cast steel former which is shaped to effect a spiral formation of the strip as it emerges from the former. This manufacture has not proved altogether satisfactory in that the abutting edges of the spirally wound strip which are welded together are frequently deformed and upturned. Certain types of machines have also been developed which enable the spiral piping to be formed by passing the strip under and around an arrangement of forming rolls but these machines are very expensive and generally complicated.

It is the object of the present invention to provide method and means for manufacturing spiral piping which will enable such piping to be more expeditiously effected and which will result in a satisfactory article.

According to this invention there is provided a spiral pipe forming machine comprising a material feed track, an inverted pyramid assembly of freely rotatable forming rolls and a welding station, said track being upwardly and forwardly inclined to feed over the central roll of the forming assembly at a sharp angle to the axes of the rolls, said rolls arranged to form no nip on material passed therethrough and the welding station located above the central roll.

Further features of this invention provide for the outer welding station above referred to be offset towards the feed track from the longitudinal axes of the forming rolls.

Many other features of the machine according to this invention will become apparent from the preferred embodiment of the invention which is described below with reference to the accompanying diagrammatic drawings. In these drawings.

Figure 1:
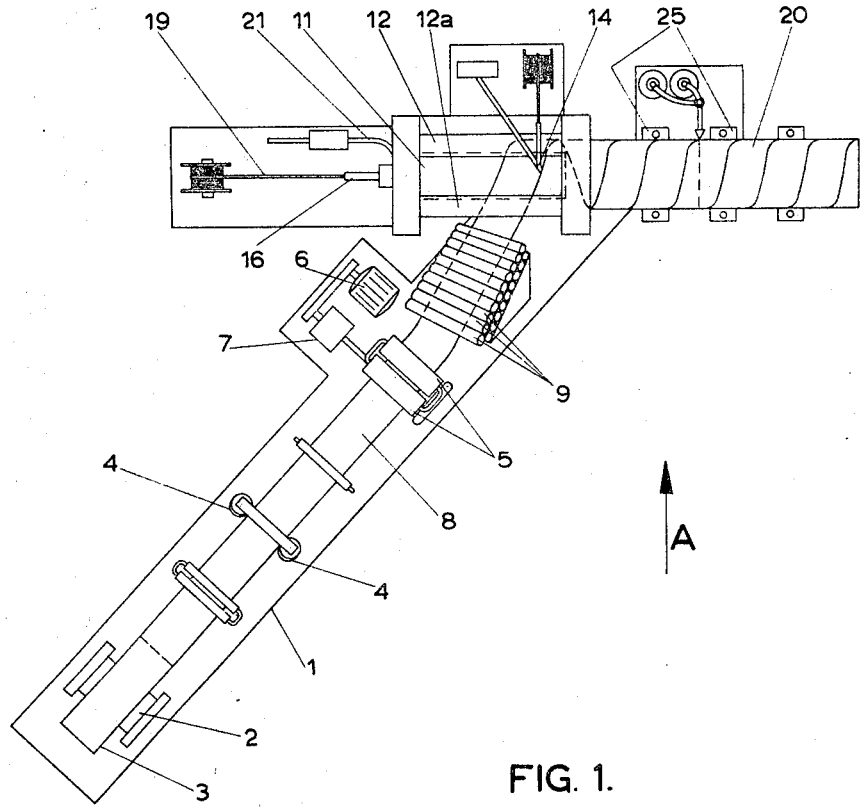
FIG. 1 is a plan view of the machine showing the general lay-out thereof.
Figure 2:
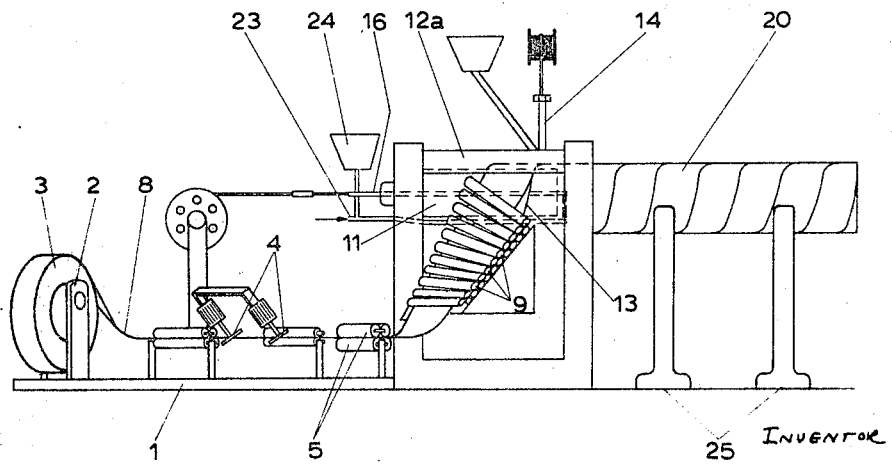
FIG. 2 is a side view of the machine in direction as indicated by arrow A in FIG. 1.

In this form the machine consists of a feed track assembly 1 which has a support 2 on which a coil of metal strip 3 of chosen dimensions is rotatably mounted. The track extends forwardly of the support and has a pair of wire buffing wheels 4 positioned to rotate and clean the edges of the strip material 8 prior to its passage through the feed rolls 5 formed as two superimposed pairs and driven by an electric motor 6, through suitable reduction gearing 7.

As it is essential that feed rolls 5 are exactly transverse to the strip material 8 provision may be made for the feed rolls to be angularly adjustable relative to the track.

Forward of the feed rolls the track consists of a series of straightening rolls 9 with the lower rolls of this series interspersed between the upper rolls. Hard metal guide blocks 10 made of material such as tool steel, are arranged on either side of the track at at least the feed and straightening portions thereof.

Figures 3A, 4, 5:
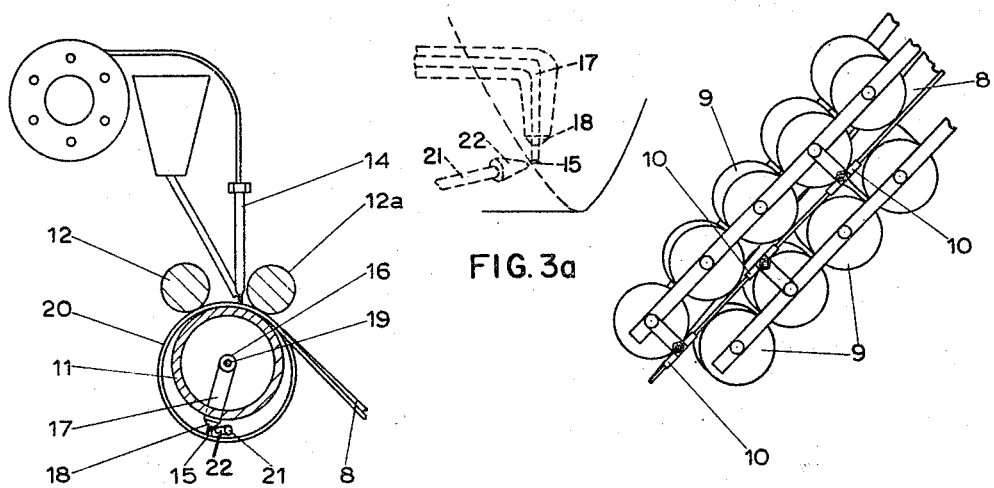
FIG. 3a is a detail showing of the inside welding nozzle.
FIG. 4 is a section along the line 3—3 in FIG. 3 with the upper forming rolls present.
FIG. 5 is an expanded side view of the lower few straightening rolls showing the twist the rolls create.
Figures 6, 6A:
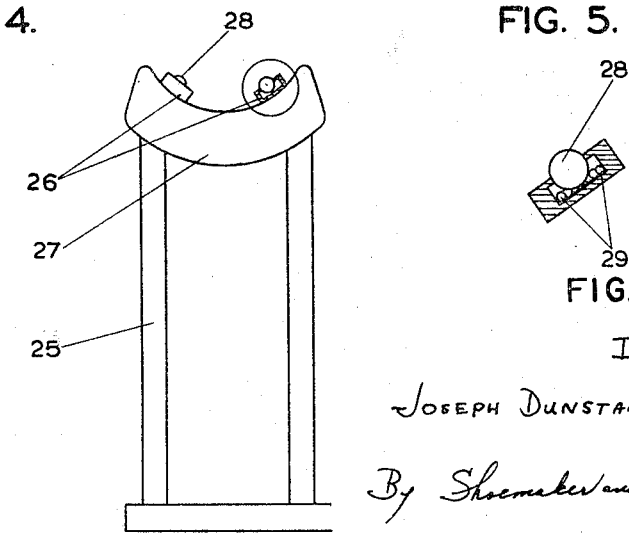
FIG. 6 is an expanded view of one of the pipe supports.
FIG. 6A is a detail view of a part of FIG. 6.

The straightening rolls follow an upwardly directed and twisted path as shown clearly in FIG. 5, so that the strip material may be fed to the inverted pyramid of assembly rolls 11, 12 and 12a in a particular manner set out below.

It will be noted that the plan view of the feed track is at a sharp angle of between about 45° and 60° to the axes of the forming rolls and the whole feed track is swivelable to a limited degree about a point on its longitudinal axis directly below the axis of the central forming roll.

The forming rolls 11, 12 and 12a are arranged with a central roll 11 forming a mandrel and the other two 12 and 12a with their axes both above the axis of the central roll 11 and off-set horizontally one to each side of the axis of the central roll. These rolls may be made up of a series of short rolls on the same axis. The leading roll 12a of these two is also appreciably higher than the second roll 12.

The rolls are arranged so that there will be no nip of strip material passed between them as is normal with forming rolls. The reason for this is described more fully below.

A pair of supporting rolls (not shown) may be arranged symmetrically below the centre roll and the free ends of the rolls, other than the central roll, are supported in a suitable mounting which also provides an outlet guide for spirally wound strip metal passing from the central roll.

As the material is so fed into the assembly the rolls bend the strip metal between them into a spirally wound arrangement loosely encircling the central roll. The metal is thus in sliding contact with the forming rolls and it will be appreciated that with different widths and thickness of the strip metal different inclinations of the guide will be required and different diameters of rolls and spacings between rolls will also be necessary for the forming of piping of different diameters. It will be appreciated that the metal, because it must slide between the rolls, is not nipped between the latter but merely controlled to form naturally into the desired spiral without the induction of undue stresses in the material.

A further feature of importance in accordance with this invention is the use of the central forming roll of substantial diameter compared with the diameter of the pipe being formed. This has the effect of manufacturing the pipe smoothly and with little or no internal tension retained in the strip after shaping through the roll assembly.

As the spirally wound strip emerges from the rolls it is found that the abutting edges remain smooth and flat enabling them to be easily welded together to form a satisfactory resultant pipe. It is envisaged that the welding operation will be effected automatically so that the manufacture of the pipe can be substantially continuous.

The welding operation above referred to is perferably effected in two stages, firstly an external weld and secondly an internal weld.

It will be understood that due to the upward inclination and twisting of the straightening roll portion of the feed track the strip material 8 first contacts the central forming roll 11 along a line parallel to the axis thereof and contacts the contiguous edge 13 of a previously formed length of pipe on this line.

Figure 3:
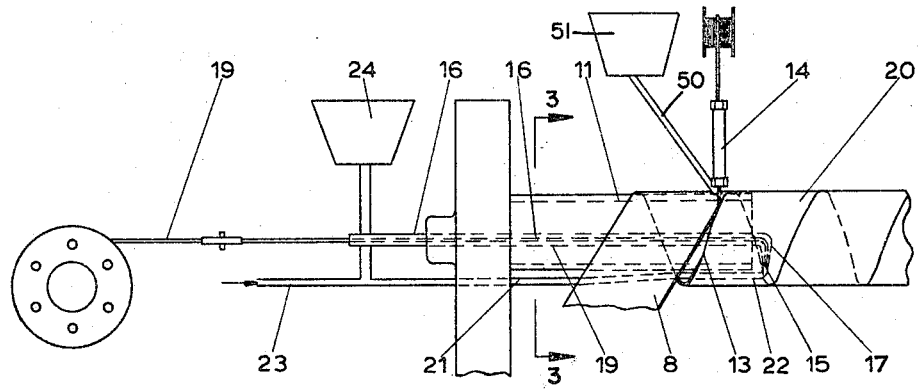
FIG. 3 is an expanded side view of actual pipe forming mechanism with the upper forming rolls removed.

An outer welding station is provided to operate with a downwardly directed tool 14 at this point so that the outside weld is made at a point on the periphery of the piping towards the top of the pipe and located ahead of the vertical centre line in relation to the direction of rotation of the piping, that is offset from the axis of the central roll towards the feed track. This is shown clearly in FIGS. 3 and 4 which also show a feed pipe 50 extending from a hopper 51 to the vicinity of the weld, the pipe and hopper being adapted to supply particulate or granular flux to this welding station. The weld is preferably continuous and in order to effect this weld at a point where successive convolutions are closely adjacent, the inverted pyramid roller assembly is orientated so that this point is located ahead of the vertical centre line of the pipe 20 being formed. This external weld is effected simultaneously with an inside weld which is formed at a point located further along the length of the pipe. The inside weld is preferably formed one half a convolution beyond the first outside weld towards the bottom of the pipe also at a point located ahead of the vertical centre line of the pipe. The position of this inside weld is marked by numeral 15 in FIGS. 3 and 4.

It is found that welding in this manner has the effect of preventing the outer weld from running as is experienced when the welds are made at points located on or beyond the vertical centre of the pipe.

To enable the second and internal weld to be effected the central forming roll 11 or mandrel is made hollow.

In this arrangement a conduit 16 extends through the centre of the mandrel and the mounting therefor. The conduit is electrically insulated from the mandrel and mounting and the end remote from the mounting is bent to project radially outwardly and downwardly from the mandrel.

The free end 17 of the conduit is arranged to be in close proximity to but out of contact with the inside wall of the piping which is to be formed around the mandrel. This conduit is made of electrically conductive material so that it may be used as the conductor for the electrical welding power supply to the welding tool 18 located at the outwardly and downwardly bent end of the conduit.

This conduit also provides a path for the consumable electrode 19 which may be fed therethrough at the same rate as it is consumed.

The spiral piping 20 being formed around the mandrel will be of larger diameter than the mandrel and a space will therefore be left between the mandrel and piping.

Into this space a length of piping 21 having a nozzle 22 at one end is inserted so that the nozzle is in close proximity to the free end 17 of the conduit.

The other end 23 of this length of piping is connected to a source of air under pressure and a supply hopper 24 is arranged to discharge into the piping between the nozzle and the point of entry of air under pressure.

For use the electrical conductor is fed through the conduit until such time as an arc is struck, between the conductor and the inside wall of the piping being formed.

Welding flux in granular or particulate form is fed into the hopper 24 in the piping 21 and air under pressure is introduced into the piping to move the flux along the pipe to the discharge nozzle. It is a feature of the present invention that the nozzle is provided with a vent for allowing the escape of air under pressure immediately the air has served the purpose of conveying the particulate flux to the nozzle. The flux is impinged onto an inside wall of the nozzle whereupon it falls by gravity from the nozzle into the welding area. Since the welding flux would have lost considerable momentum by impingement on the wall of the nozzle, the flux falls gently by gravity from the nozzle.

A submerged arc welding operation is thus performed on the inside wall of the spiral piping and the position of the weld may be adjusted by movement of the conduit carrying the electrode and the nozzle supplying the flux.

While the above welding operations have been described as applied to submerged arc welding it will be appreciated that this invention also envisages the use of high frequency electrical welding.

Forward of the forming rolls a cradle is arranged to support the spiral piping as it is formed and fed from the forming rolls. Each support 25 for the pipe has a pair of symmetrically disposed elements 26 in a substantially semicircular frame 27 below the piping. These units each consist of a large ball 28 retained to contact the piping and be rested in a bed of smaller diameter balls 29. This arrangement gives a very smooth feed of the formed piping.

It will be appreciated that the piping is formed substantially continuously as above described and an automatic reciprocating cutting mechanism of known type will preferably be provided adjacent the cradle so that predetermined lengths of the pipe which can be removed from the cradle in any convenient manner and transported for storage or dispatch.

What I claim as new and desire to secure by Letters Patent is:

1. A spiral pipe forming machine comprising a material feed track which includes a bed of straightening rolls, an inverted pyramid assembly of freely rotatable forming rolls and a welding station, said bed of straightening rolls being upwardly and forwardly inclined to feed over the central roll of the forming assembly at a sharp angle to the axes of the forming rolls, said bed of straightening rolls being twisted to ensure that material passed therealong will contact the central forming roll along a line substantially parallel to the axis thereof, said forming rolls being arranged to form no nip on material passed therethrough and the welding station located above the central roll.

2. A spiral pipe forming machine as claimed in claim 1 in which the feed track is adjustably inclined to the forming rolls.

3. A spiral pipe forming machine as claimed in claim 2 in which the feed track includes a bed of feed rolls and a mounting for a coil supply of strip material.

4. A spiral pipe forming machine as claimed in claim 3 in which hard metal guide blocks are associated with the feed track and straightening rolls.

5. A spiral pipe forming machine as claimed in claim 1 in which the central roll is hollow and a second welding station is provided and includes a feed therefor located through the central roll.

6. A spiral pipe forming machine as claimed in claim 5 in which a flux feed to the inner welding station is provided and comprises a conduit terminating in a nozzle, inlet and outlet openings for air under pressure in the conduit and a hopper having a discharge opening into the conduit between the air inlet and outlet openings.

7. A spiral pipe forming machine as claimed in claim 1 in which the welding station above the central roll is offset from the longitudinal axis of the roll towards the feed track.

8. A spiral pipe forming machine as claimed in claim 1 in which an automatic pipe severing assembly is provided adjacent the forward end of the forming rolls.

References Cited

UNITED STATES PATENTS

| | | | |
|---|---|---|---|
| 2,819,379 | 1/1958 | Wiley et al. | 228—15 |
| 3,239,122 | 3/1966 | Berkeley | 228—15 |
| 3,217,402 | 11/1965 | Eckhardt | 228—15 |
| 1,939,581 | 12/1933 | Tesmer | 228—15 |
| 2,991,740 | 7/1961 | Eckhardt | 228—15 |
| 3,090,336 | 5/1963 | Gruter | 228—15 |
| 3,210,980 | 10/1965 | Sengel | 228—15 |
| 3,030,488 | 4/1962 | Kuckens | 219—62 |
| 3,024,348 | 3/1962 | Cavel | 219—62 |
| 2,727,125 | 12/1955 | Muller | 219—74 |
| 2,786,933 | 3/1957 | Hume | 219—130 |

RICHARD H. EANES, JR., *Primary Examiner.*